Dec. 27, 1966   L. D. SOUBIER ETAL   3,294,509
METHOD OF AND APPARATUS FOR PRODUCING NON-THERMAL
CURRENTS IN A BODY OF MOLTEN GLASS
Filed July 16, 1962   10 Sheets-Sheet 1

INVENTORS
LEONARD D. SOUBIER
BY ARTHUR B. SWAIN, JR.
J. R. Nelsen and
W. A. Schaich
ATTORNEYS Dec. 27, 1966   L. D. SOUBIER ETAL   3,294,509
METHOD OF AND APPARATUS FOR PRODUCING NON-THERMAL
CURRENTS IN A BODY OF MOLTEN GLASS
Filed July 16, 1962   10 Sheets-Sheet 4

INVENTORS
LEONARD D. SOUBIER
BY ARTHUR B. SWAIN, JR.
J. R. Nelson and
W. A. Schaich
ATTORNEYS Dec. 27, 1966   L. D. SOUBIER ETAL   3,294,509
METHOD OF AND APPARATUS FOR PRODUCING NON-THERMAL
CURRENTS IN A BODY OF MOLTEN GLASS
Filed July 16, 1962   10 Sheets-Sheet 5

INVENTORS
LEONARD D. SOUBIER
BY ARTHUR B. SWAIN, JR.
J. R. Nilson and
W. A. Schaich
ATTORNEYS

INVENTORS
LEONARD D. SOUBIER
BY ARTHUR B. SWAIN, JR.
ATTORNEYS

INVENTORS
LEONARD D. SOUBIER
BY ARTHUR B. SWAIN, JR.
J. R. Nelson and
W. A. Schaich
ATTORNEYS Dec. 27, 1966 L. D. SOUBIER ET AL 3,294,509
METHOD OF AND APPARATUS FOR PRODUCING NON-THERMAL
CURRENTS IN A BODY OF MOLTEN GLASS
Filed July 16, 1962 10 Sheets-Sheet 10

INVENTORS
LEONARD D. SOUBIER
BY ARTHUR B. SWAIN, JR.
J. R. Nelson and
W. A. Schaich
ATTORNEYS United States Patent Office 3,294,509
Patented Dec. 27, 1966

3,294,509
METHOD OF AND APPARATUS FOR PRODUCING NON-THERMAL CURRENTS IN A BODY OF MOLTEN GLASS
Leonard D. Soubier, deceased, late of Toledo, Ohio, by Olive M. Soubier, executrix, Toledo, Ohio, and Arthur B. Swain, Jr., Toledo, Ohio, assignors to Owens-Illinois Inc., a corporation of Ohio
Filed July 16, 1962, Ser. No. 211,473
4 Claims. (Cl. 65—134)

The present invention relates to a method of and apparatus for producing non-thermal currents in a body of molten glass. More particularly, this invention relates to the creation of non-thermal currents in a reversibly fired glass melting furnace in accordance with the direction and frequency of firing.

It has been previously proposed that non-thermal currents be generated within glass bodies, for example within a glass melting tank, by the bubbling of a gaseous medium through the molten glass body or by otherwise agitating the glass body. For example, in Patents Nos. 2,884,744; 2,387,222; and 2,890,548, various means for producing gaseous bubbles within a body of molten glass have been proposed.

In a typical gas-fired glass melting furnace, glass batch ingredients are fed into one of a melting tank for flow through the tank to an outlet port or "throat" from which the molten glass flows into a refiner tank for subsequent refining. The melting tank is provided with transversely aligned, oppositely disposed heating ports arranged transversely to the direction of flow of the glass ingredients and molten glass through the tank to the throat. Normally a plurality of ports are arranged along each side wall of the tank, and these ports are simultaneously fired, i.e. supplied with gas-air mixture for combustion in the tank, the flame playing over the layer of dry batch fed onto the surface of previously molten glass in the tank.

The combustion products are removed from the furnace through those ports disposed on the opposite side of the tank, these combustion products flowing through the firing ports on the opposite side and passing over refractory "checkers" which serve as heat recovery regenerators since the checkers will be heated by the combustion products flowing therethrough. This stored heat is utilized when the furnace firing is reversed, and the combustible mixture is passed from the ports on the opposite side for exit through the ports through which the initial firing occurred.

Such reversely fired furnaces are well known in the art and operate on a normal reversal cycle of from 20 to 30 minutes. Of course, the object of reversely firing and of utilizing regenerative checkers is to recover as much of the heat of the combustion products as possible.

Although regenerative reverse firing of a glass melting furnace is advantageous in substantially cutting down heat losses by utilizing the heat of the exhaust gases as above explained, there are certain inherent disadvantages in this method of melting. The combustible gas and preheated air mixture is introduced into the furnace at a substantial velocity and in a direction so as to play across the surface of the molten glass and the unmelted glass batch on top of the molten glass. Consequently, at any stage of the melting process, one side of the furnace is inherently hotter than the other side, i.e. the cold side of the furnace is that side adjacent the port where the firing is being carried on, since combustion occurs in the furnace at a distance from the firing port. Of course, the reversal of firing direction reverses the relative "hot" and "cold" sides of the furnace, with the center of the furnace always being "hot." As a result, the molten glass tends to "channel" or to flow more freely through the center of the tank and the colder glass along the sides of the tank tends to remain in position and move quite slowly. Further, the non-molten batch spread upon the surface of the molten glass tends to drift laterally within the furnace to collect at the "cold" or firing side, due to the relatively quiescent molten glass therebeneath and the relatively increased "pull" of molten glass from the other furnace areas.

The present invention proposes that the body of molten glass in a reversibly fired melting furnace be agitated in accordance with the direction and frequency of firing in order to eliminate the difficulties heretofore summarized and to increase the efficiency of melting, i.e. to increase the amount of molten glass obtained by the consumption of a given amount of fuel. More specifically, the melter tank is provided with a plurality of bubblers or similar agitation devices for generating non-thermal currents within the molten glass body in a non-uniform fashion across the width or lateral extent of the furnace. These bubblers are capable of differential bubbling rates, and a greater bubbling effect is generated and maintained on the cold side of the furnace than upon the hot side of the furnace.

In other words, a first group of bubblers is arranged in the floor of the furnace adjacent a first set of firing ports and a second set of bubblers is arranged in the furnace floor adjacent the opposite set of firing ports. These bubblers are capable of emitting the gaseous bubbling medium at different rates, and the first group of bubblers is operated to effect a greater degree of agitation when the furnace is fired from the first set of ports and a lesser degree of agitation, or even no agitation at all, is accomplished through the other set of bubblers. Thus, maximum agitation is obtained on the "cold" side of the furnace to generate upon this cold side a substantially greater agitation of the molten glass body.

This agitation, as with all bubblers, raises the relatively colder glass at the bottom of the furnace to the surface of the molten glass for exposure to heat. The displacement of the lower portions of the molten glass body, then induces a flow of relatively hotter glass from the hot side of the furnace toward the cold side thereof. As a result, there is increased circulation of molten glass in the molten body, there is a movement of the colder portions of the glass body to an area at which it will be exposed to greater amounts of heat, and there is a displacement of hotter portions of the glass body into those normally colder regions of the furnace to thereby increase the overall temperature of the molten glass body.

Additionally, there is a substantially lessened tendency for the glass batch to migrate laterally of the furnace in view of the greater thermal uniformity of the molten glass body therebeneath. Further, the increased uniformity in the temperature of the molten glass body will tend to prevent the differential flow or channeling of molten glass through the melting area.

Of course, the two sides of the furnaces are alternately the "hot" side and the "cold" side of the furnace, due to reversal of the firing through the two sets of ports. Accordingly, it is necessary to reverse the relative degrees of agitation effected by the bubbling from one side of the furnace to the other. This can be readily accomplished by emitting a greater volume of gaseous medium from the bubblers on the "cold" side of the furnace, to effect increased agitation, relative to the volume emitted on the other side of the furnace. Such an increased volume can be obtained by emitting bubbles at either an increased frequency or an increased pressure.

It is, therefore, an important object of the present invention to provide an improved method and apparatus for creating non-thermal currents in a glass melting furnace and correlating the creation of such currents with the direction and frequency of firing the furnace.

Another important object of the present invention is the provision of a method for increasing the melting efficiency and the molten glass output of a reversibly fired glass melting furnace by bubbling a gaseous medium therethrough to agitate the molten glass body on the side of the furnace from which firing is being effected.

It is a further object of this invention to provide a gas fired regenerative-type melting apparatus for utilization in a glass making process and including a mechanism for bubbling a gaseous medium through the resultant molten glass in proximity to the melting apparatus firing ports and means correlating the emission of bubbles from the mechanism so that a greater degree of agitation occurs within the apparatus on that side thereof which is relatively colder than the other side thereof.

It is yet another, and no less important, object of the present invention to provide a method of and apparatus for emitting a series of gaseous bubbles at the floor of a glass melting tank for travel upwardly through molten glass therein and correlating the flow of bubbles with the direction of firing of the furnace so that a greater amount of bubbles are emitted on the side from which firing occurs to equalize the temperature of the molten glass and to centralize any unmelted batch on the body of molten glass.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

GENERAL FURNACE STRUCTURE

Figure 1:
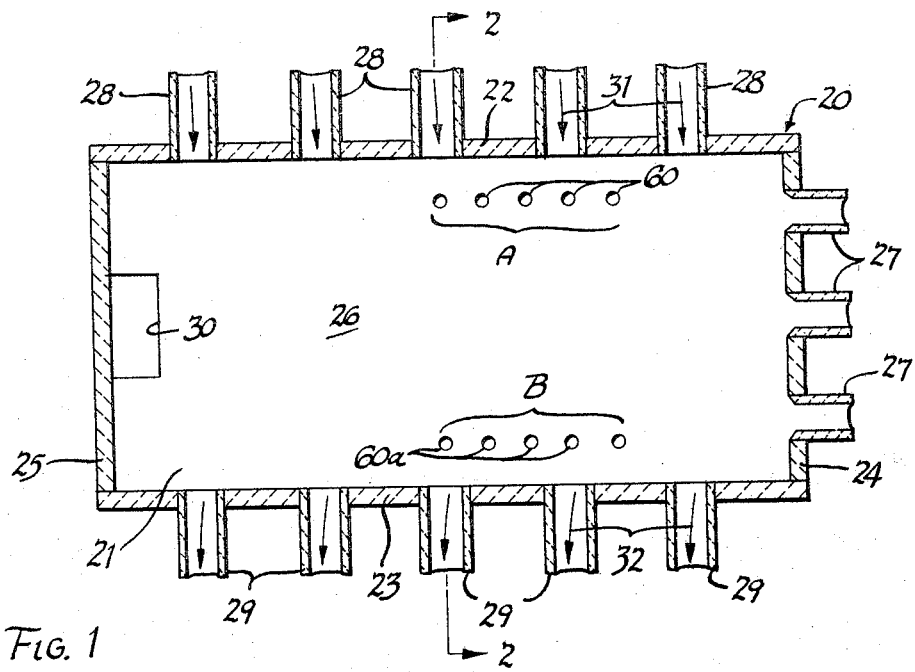
FIGURE 1 is a diagrammatic plan view of a glass melting furnace provided with agitating means of the present invention and capable of carrying out the method of this invention.

In FIGURE 1, reference numeral 20 refers generally to a glass melting furnace having a floor 21, side walls 22, 23 and end walls 24, 25 formed of refractory material and enclosing a space 26. Glass batch materials are introduced into the space 26 through feed chutes 27 in the end wall 24 to be reduced to molten form by a combustible mixture introduced into the space 26 through firing ports 28 in the wall 22, the products of combustion exiting through identical ports 29 in the wall 23 and the molten glass leaving the space 26 through an outlet opening or "throat" 30 discharging beneath the end wall 25. In a regenerative glass furnace which is gas-fired, the combustible mixture is introduced alternatively through the firing ports 28 and the ports 29. In FIGURE 1, this combustible mixture flows in a path indicated by directional arrows 31 into the space 26, and the exhaust gases exit from the space 26 through the ports 29 as indicated by directional arrows 32. After a predetermined firing period, generally on the order of from 20 to 30 minutes, the flow of combustible mixture is reversed, and the combustible mixture is introduced into the space 26 through the ports 29 for flow in a direction opposite to that indicated by the arrows 32 and exhausted through the ports 28 in a direction reverse to that indicated by the arrows 31.

Turning now to FIGURES 2 through 5, the furnace 20 of FIGURE 1 is illustrated in greater detail, and it will be seen that the space 26 underlies an overhead refractory roof 33 joined at its extremities, as at 34, with exterior side walls 35, while the side walls 22, 23 enclosing the space 26 are joined through horizontal wall portions 36 with vertical inner walls 37. The horizontal wall sections 36 cooperate with a corresponding parallel portion of the roof 33 to define the ports 28 and 29 while the outer walls 35 and the inner walls 37 cooperate to define therebetween passages 38 and 39 in full communication with the space 26 through ports 28 and 29, respectively.

The outer walls 35 and the inner walls 37 each communicate through joining wall portions 40, 41, respectively with a common flow passage indicated generally at 42. A baffle 43 located in this space 42 divides the passage 42 into a portion communicating freely with a common exhaust passage 44 and a common inlet 45 for air. The baffle 43 cooperates with additional refractory plates 46 which serve as directional valves to interconnect the air passage 45 with the passage 38 and to interconnect the exhaust passage 44 with the passage 39, when the valve elements are positioned as illustrated. These valve elements 46 are movable by suitable means, such as by elevating cables 47 lapping a sheave 48. This sheave 48 is rotatable with a sprocket 49 meshing with a rack 50, the rack being formed as a part of the piston rod of a reciprocating fluid pressure actuated cylinder 51.

A pair of damper valve elements 52 are positioned to control the flow of air from the air intake opening 45, these damper elements also being carried by a cable 53 for joint displacement upon actuation of a pulley 54 driven by suitable means, as by a reversible electric motor 55.

Positioned in each of the passages 38 and 39 and adjacent the firing ports 28, 29, respectively, is a fuel inlet pipe 56, fuel being introduced through one set of the pipes at a time for admixture with air flowing through the appropriate inlet passage 38, 39 and ignition interiorly of the furnace to play over the body of molten glass 26.

Disposed within the passages 38, 39, respectively are regenerative checkers, indicated generally at 57. These regenerative checkers 57 are formed of refractory brick or blocks secured together by mortar or the like in an open lattice-work pattern.

Assuming that the direction of firing is as indicated by the directional arrows 31, 32 and that gaseous fuel is being introduced through the left-hand inlet pipe 56, inlet air will flow through the passage 38 for admixture with the fuel to form a combustible mixture to be introduced through the firing port 28 into the furnace. Exhaust gas will flow through the port 29 and through the regenerative checker work 57 in the passage 39, waste gas then flowing through the extension of the passage 39 defined by the walls 40 and 41 and through the exhaust passage 44.

During the passage of these exhaust gases through the checker work 57 in the exhaust passage 39, the bricks constituting the checkers will become heated to an appreciable extent. This heat stored within the refractory checkers will serve to heat air subsequently introduced through the passage 39 for admixture with fuel to be introduced through the port 29 upon subsequent reversal of the direction of firing. Thus, this preheated air will increase the combustion efficiency of the combustible mixture introduced through the firing port 29, and substantial amounts of sensible heat will also be recovered.

Figure 2:
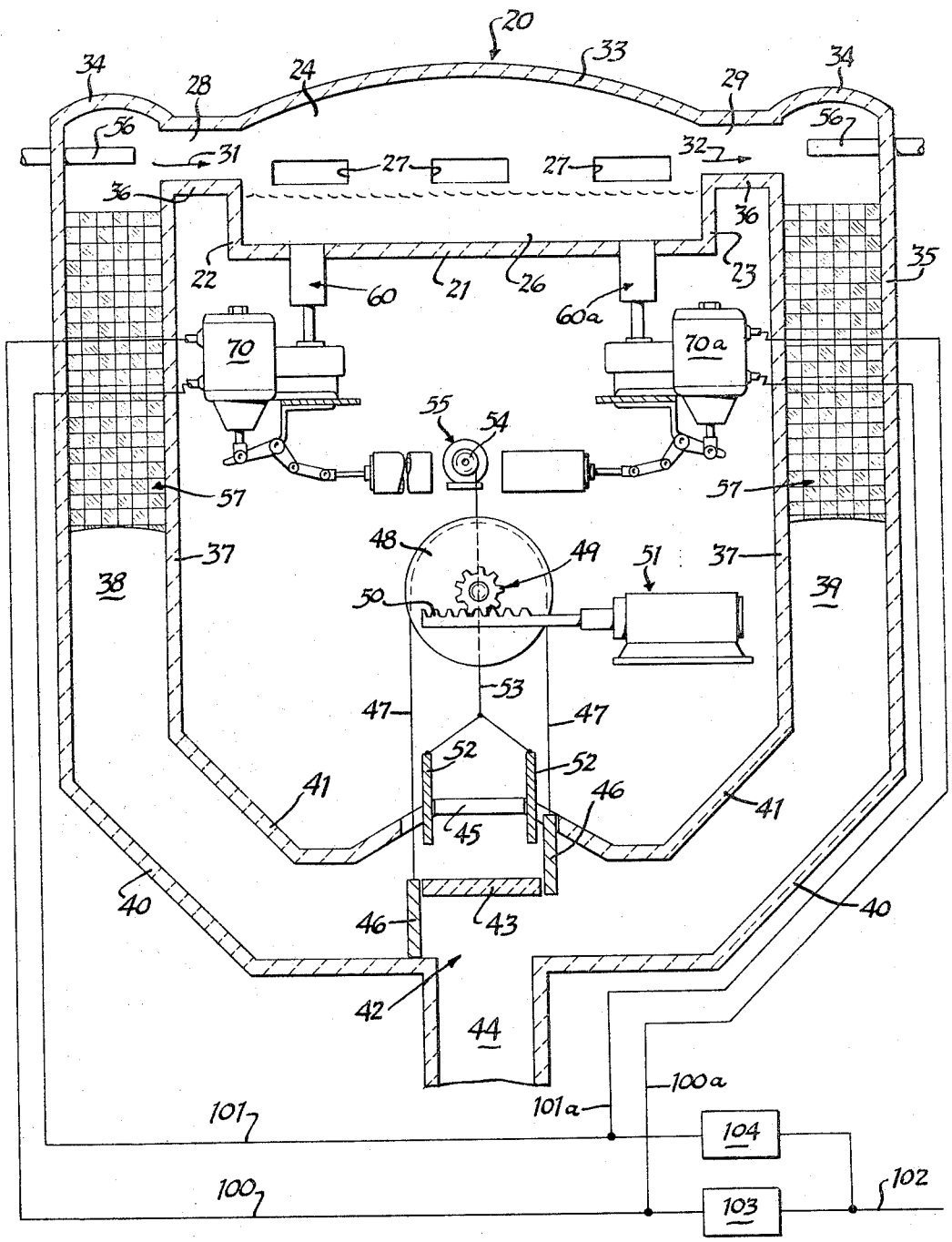
FIGURE 2 is a vertical sectional view taken along the plane 2—2 of FIGURE 1.
Figure 3:
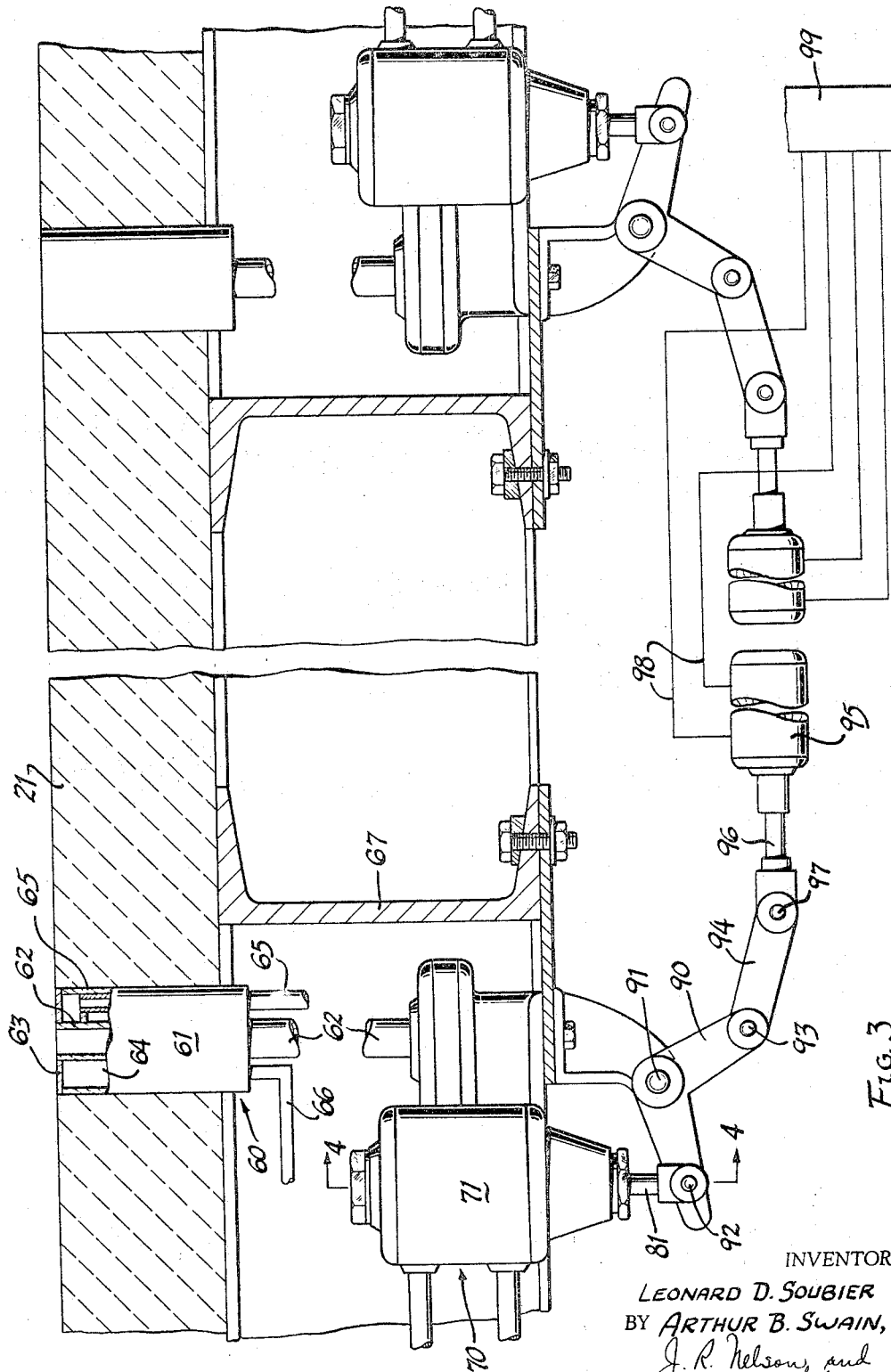
FIGURE 3 is an enlarged fragmentary sectional view similar to FIGURE 2 and illustrating a portion thereof in greater detail.

The furnace thus far described in connection with FIGURE 2 is conventional and is representative of actual regenerative furnaces presently being utilized on a commercial basis.

THE EMBODIMENT OF FIGURES 1 THROUGH 5

As best illustrated in FIGURES 1 and 2, there is located in the floor 21 of the furnace 20 a plurality of bubbler units 60. Such bubbler units 60 are grouped with a plurality of such units designated at "A" being aligned parallel to and closely spaced from the side wall 22 of the tank 20 and a second group of bubblers 60 designated as "B" being aligned in a group parallel to and closely adjacent to the side walls 23. Each of these bubblers 60 (FIGURE 3) comprises an outer cylindrical metal shell 61 concentrically surrounding an inner axially extending pipe 62, the shell 61 and the pipe 62 being interconnected by annular end plates 63 to surround an interior coolant space 64 into which a coolant, such as water, is introduced, as through an inlet pipe 65, and removed, as through an outlet pipe 66. This assembly projects through the bottom wall 21 of the furnace which is supported by laterally spaced supporting channels or the like 67.

Figure 4:
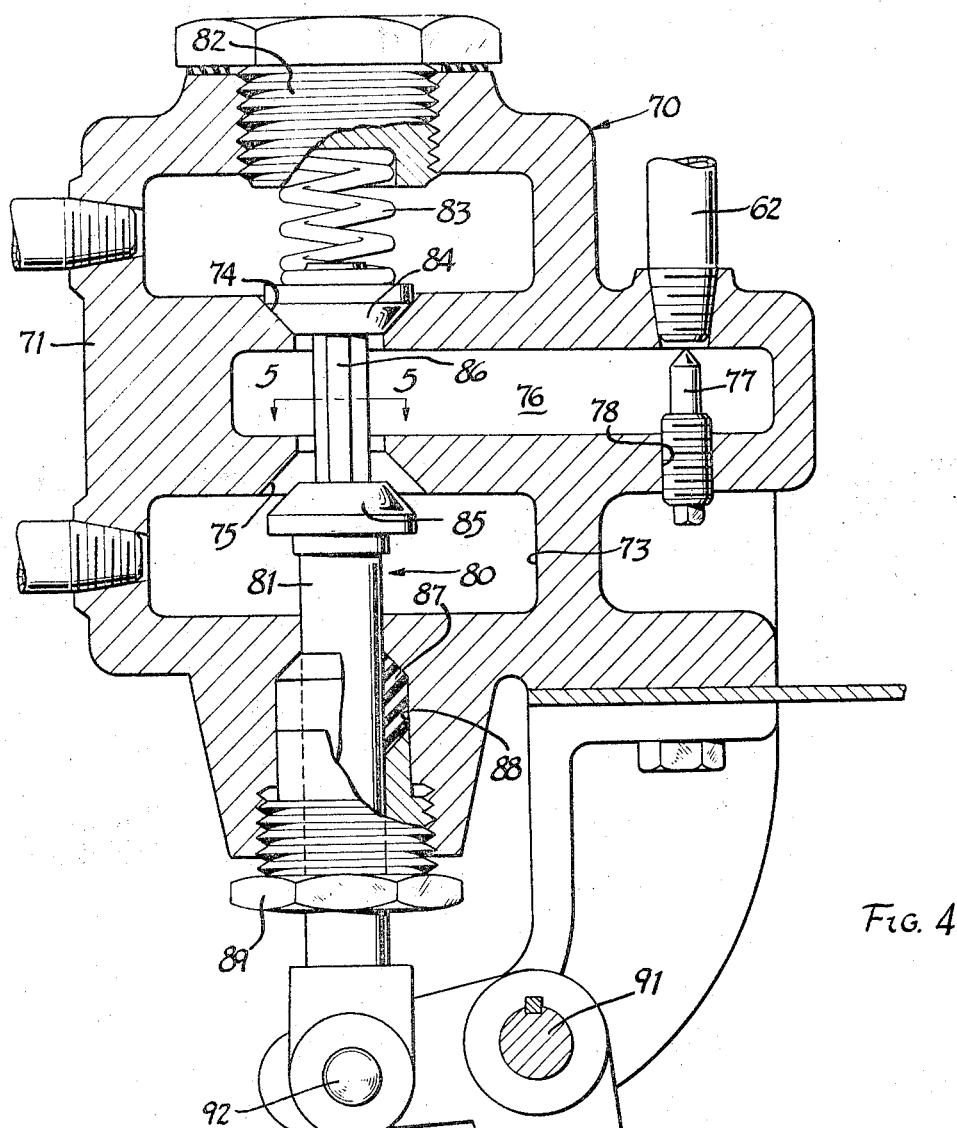
FIGURE 4 is a sectional view, with parts shown in elevation, taken along the plane 4—4 of FIGURE 3.
Figure 5:
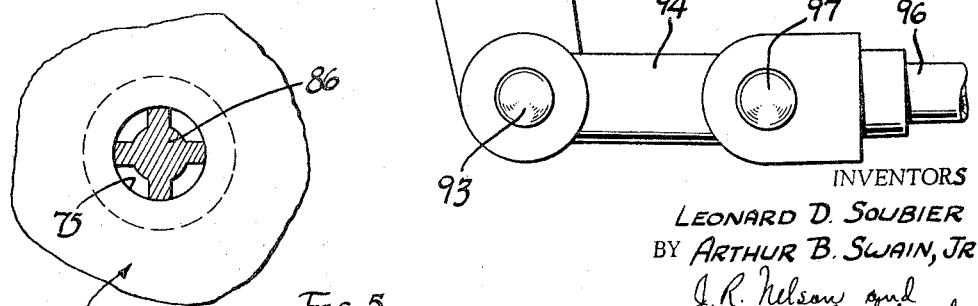
FIGURE 5 is a fragmentary sectional view taken along the plane 5—5 of FIGURE 4.

The central pipe 62 projects axially beyond the exterior shell 61 to receive a gaseous fluid, such as air, from a valve assembly 70 best illustrated in FIGURE 4 of the drawings.

This valve assembly 70 comprises an outer shell or casing 71 having a pair of interior inlet chambers 72 and 73 communicating through tapered frusto-conical valve seats 74, 75, respectively, with a centrally located outlet passage 76. This outlet passage 76 communicates with the bubbler pipe 62, and the flow of air from the outlet passage 76 into the pipe 62 is controlled by an adjustable needle valve 77 threaded into a bore 78 in the valve casing 71 aligned with the pipe 62 for adjustment relative thereto.

The flow of air between the inlet passages 72, 73 and the outlet passage 76 is under the control of a valve body 80 having spaced frusto-conical embossments 84, 85 mounted on an axially reciprocable valve stem 81. The valving abutments 84 and 85 are complementary to the corresponding valve seat surfaces 74, 75 and accurately control the flow of air through these valve passages. The valve body 80 is normally urged to its illustrated position of FIGURE 4 by means of a coil compression spring 83 confined between a threaded cap 82 surmounting the valve casing 71 and the upper extremity of the valve embossment 84. The valve embossments 84, 85 are interconnected by a reduced portion 86 of the valve stem 81, this valve stem portion 86 having the configuration illustrated in FIGURE 5 and being of cruciform shape to project freely through the valve seats 74, 75. The valve stem 81 is sealed at its lower end into the valve casing 71 by means of an elastomeric seal 87 confined in a casing recess 88 of conforming configuration by a threaded plug 89.

The valve stem 81 is actuated by a fluid pressure actuated cylinder 95, the stem 81, and the cylinder 95 being interconnected by a bell crank lever 90 medially pivoted at 91 and having its extremities pivoted, as at 92, 93 to the valve stem 81 and to a link 94, respectively. The cylinder 95 has its actuating piston 96 pivotally connected, as at 97, to the free end of the link 94.

The piston 95 is of the double acting type and receives fluid under pressure through lines 98 from a control valve unit 99. This control unit 99 also serves to actuate the valve motor 51 for the air inlet and exhaust valves 46.

As best illustrated in FIGURE 2 of the drawings, the upper valve inlet chamber 72 of the valve 70 receives air under pressure from a conduit 100 while the lower chamber 73 receives air under pressure through a conduit 101. These conduits are connected to a source of air under pressure from a source line 102 through individual pressure control valves 103 and 104, respectively. Air under pressure from the source 102 into the conduit 101 is at a substantially higher pressure than air under pressure introduced into the conduit 100 through the valve 103. Thus, the valve 70 heretofore described introduces air under pressure through the bubblers 60 constituting the bubbler unit "A." An identical valve 70a is provided to introduce air under pressure through the bubblers 50a constituting the bubbler unit "B." This valve 70a is identical with the valve 70 heretofore described and the upper chamber 72 thereof receives air under pressure from a conduit 100a which, in turn, receives air under relatively high pressure from the valve 103, while the lower chamber 73 thereof receives air at a substantially higher pressure through the line 101a and the valve 104. The actuation of the cylinders 95 is correlated with the actuation of the cylinder 51 for the valves 46 by suitable means, e.g., by means of a limit switch actuating abutment on the cable 47 as described hereafter in connection with the embodiment of FIGURES 6 through 8. Thus, a reversal of valves 46 will relatively reverse the valves 70 and 70a.

Further, it will be appreciated that a valve 70, 70a may be provided for each individual bubbler unit 60, 60a or that a single such valve 70, 70a may control the plurality of bubblers constituting the groups A and B, respectively.

In that embodiment of the invention illustrated in FIGURES 1 through 5, assuming that the direction of firing is as illustrated in FIGURE 2 of the drawings, with firing occurring through the port 28, the left-hand side of the furnace can be designated as the cold side, since firing through the port 28 will direct the combustion mixture against the roof 33 of the furnace and against the surface of the molten glass at a location remote from the firing port 28. Thus, the temperatures in the region of the exhaust ports 29 will be greater than that immediately adjacent the firing ports 28. The bubbler unit 60 may be identified as underlying the "cold" side of the furnace and the bubbler unit 60a as underlying the "hot" side of the furnace.

To promote uniformity of temperature across the width of the furnace and specifically within the body of molten glass 26, the molten glass overlying the bubbler unit 60 must be agitated to a degree substantially greater than the degree of agitation exerted by the bubbler unit 60a. Accordingly, the double acting hydraulic cylinder 95 for the bubbler unit 60 is actuated to retract the cylinder rod 96, to move the bell crank lever 90 in a counterclockwise direction and to move the valve stem 81 downwardly to the position illustrated in FIGURE 4 of the drawings. The compression spring 83 aids in such movement.

Therefore, the high pressure air in the chamber 73 of the valve body 70 flows freely through the port 75 and the outlet chamber 76 into the bubbler pipe 62, such air then escaping from the pipe in the form of bubbles to rise through the body 26 of molten glass directly overlying the bubbler 60.

At the same time, the cylinder 95 for the right-hand bubbler unit 60a is extended to elevate the valve stem 81 of the valve unit 70a, so that the bubbler pipe 62a receives air under pressure from the low pressure chamber 72 of the valve body, this low pressure air passing through the valve port 74 and the outlet chamber 76 into the pipe 62a. Depending upon the pressure of air within the low pressure chamber 72, bubbles will either be intermittently passed through that portion of the body 26 of molten glass overlying the bubbler unit 60a, or the hydrostatic pressure of the molten glass exerted on the column of air within the bubbler pipe 62 will merely be counterbalanced by such pressure and substantially no bubbles will be emitted.

In either event, the glass on the cold side of the furnace, i.e. above the bubbler unit 60, will be agitated to a substantially greater degree than the glass on the hot side of the furnace, i.e. overlying the bubbler unit 60a.

THE EMBODIMENT OF FIGURES 6 THROUGH 8

Figure 6:
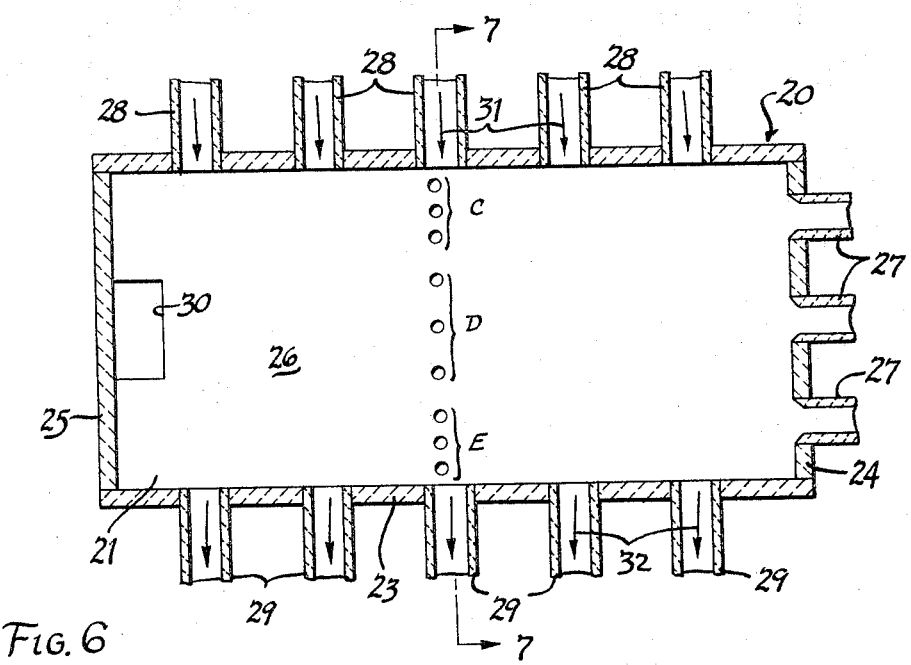
FIGURE 6 is a view similar to FIGURE 1 illustrating a modified embodiment of the invention.
Figure 7:
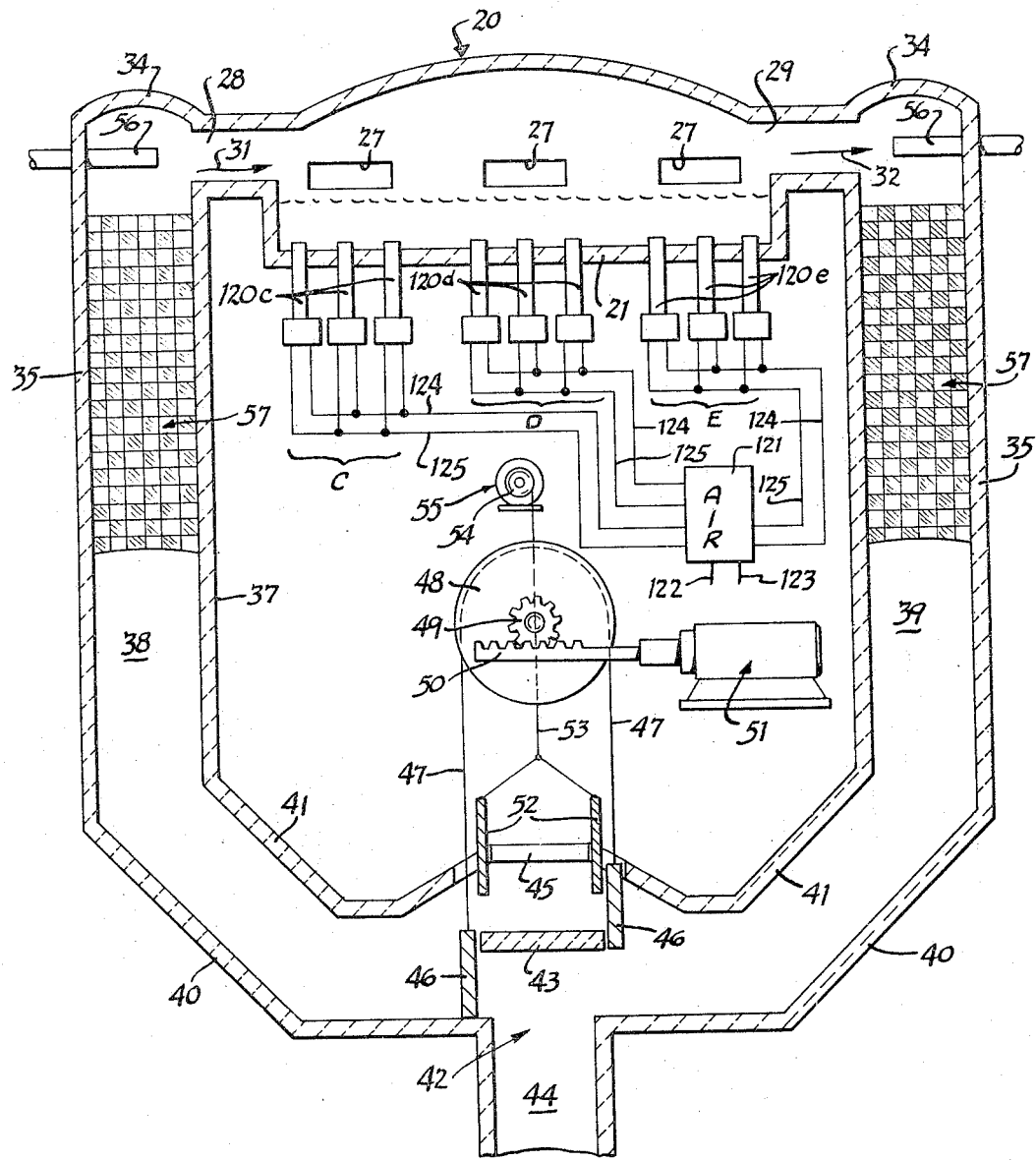
FIGURE 7 is a view similar to FIGURE 2, but further illustrating the embodiment of FIGURE 6 and taken along the plane 7—7 of FIGURE 6.
Figure 8:
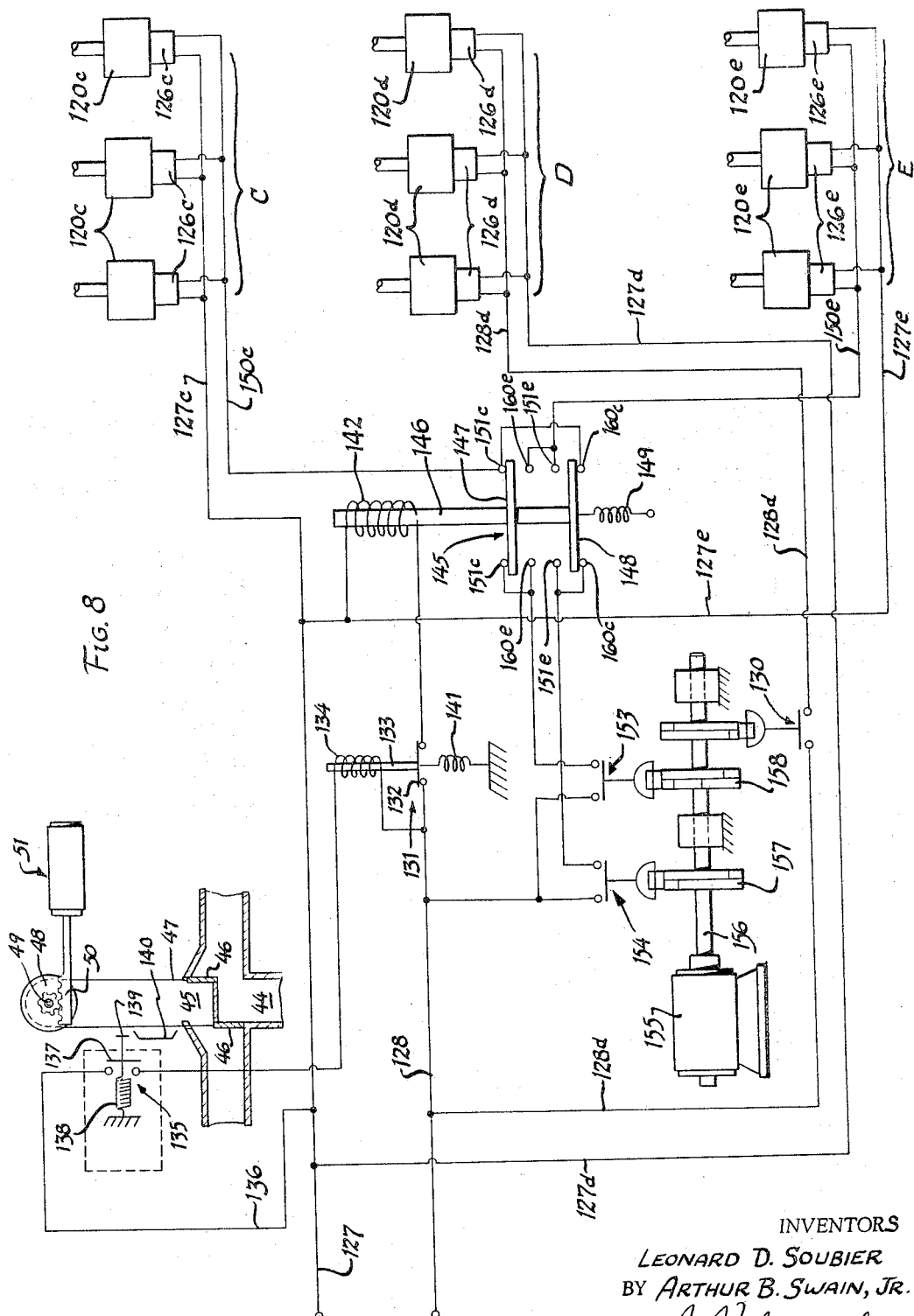
FIGURE 8 is a schematic electrical diagram illustrating the control circuit for that embodiment of FIGURES 6 and 7 of the drawings.

In that embodiment of the invention illustrated in FIGURES 6, 7 and 8, it will be noted that three groups of bubblers denoted as "C," "D" and "E" are positioned with a furnace structure 20 substantially the same as the furnace structure above-identified and provided with firing ports 28, 29, feeding ports 27 and an outlet throat 30. Further, it will be noted that a single transverse line of bubblers are illustrated, as opposed with the single longitudinal line of bubblers in each of the groups "A" and "B" of FIGURE 1. The specific arrangement of FIGURE 6 may, of course, be duplicated with a series of longitudinally spaced transversely aligned groups "C," "D" and "E" if desired.

From FIGURE 7 of the drawings, it will be seen that the furnace arrangement is substantially identical with that heretofore described, including the identical arrangement for the duct valving through the valve elements 46 and the identical arrangements for damping by means of the damper elements 52.

In view of the similarities of the overall furnace structure, it will be readily apparent that the only substantial differences between that embodiment of FIGURES 1 through 5 and that embodiment of FIGURES 6 through 8 resides in the arrangement and actuation of the bubblers.

As perhaps best shown in FIGURE 7 of the drawings, the bubblers are indicated by reference numerals 120c, 120d and 120e, the suffix indicating, and being the same as the group within which any specific bubbler occurs. All of these bubblers are identical, and all are of the type emitting enlarged, particularly effective gaseous bubbles as disclosed in the Patent to J. W. Wright No. 2,890,548.

More specifically, each of these bubbler units 120c, 120d and 120e is connected both to a high pressure source and a low pressure source, and the bubblers each include a solenoid valve whereby high pressure air is periodically introduced into the bubbler tube to be emitted therefrom as a bubble. The low pressure air preferably is of a value sufficent to merely counterbalance the hydrostatic head exerted at the exit end of the bubbler tube by the body of molten glass thereover. Inasmuch as all of the details of this specific bubbler are identical with the structure disclosed in said Wright patent, it appears unnecessary to describe the bubblers in detail in the instant application.

As schematically illustrated in FIGURE 7 of the drawings, each of the bubblers 120c, 120d and 120e receives air under pressure from an air manifold 121 which receives high pressure air through a line 122 and low pressure air through a line 123. The manifold 121 is effective to distribute low pressure air to each of the bubblers through lines 124 and is effective to distribute high pressure air thereto through lines 125.

Referring now to FIGURE 8 of the drawings, the solenoid control valves for each of the bubbler units 120c, 120d and 120e is indicated by reference numeral 126, followed by the appropriate suffix. One side of each of the solenoids is connected to a suitable source of electricity by conductor 127 and branch conductor 127c, 127d and 127e, respectively.

The other source conductor 128 is connected to the other side of the solenoids 126d by a branch line 128d having interposed therein a cam-actuated switch 130 to be hereinafter more fully described in detail. Additionally, the line 128 has interposed therein a solenoid-actuated switch 131, the contact 132 of which has an armature 133 wrapped by a solenoid coil 134 connected to the source line 127 through a cam-actuated switch 135 interposed in a line 136.

This cam-actuated switching 135 has its contact 137 urged to a normally opened position by a compression spring 138. The contact 137 closes the switch 135 whenever a cam follower 139 is contacted by a cam surface 140 carried by the actuating cable 47 for the valve elements 46. The location of the cam plate 140 on the cable 47 is such that the switch 135 is closed to energize the solenoid winding 134 whenever the valve elements 46 are positioned to connect the ports 29 of the furnace 20 with the source of air under pressure, i.e. whenever the furnace is being fired from the port 29. This condition, of course, is the opposite of that illustrated in FIGURE 7, wherein the firing is being accomplished through the port 28.

Energization of the solenoid winding 134 will open the switch 131 from its illustrated position against the bias of tension spring 141 which normally holds the switch in its illustrated closed position. Closure of the switch 131 will actuate solenoid winding 142 for a multiple pole switch 145 constituting the main reversing control switch of the present invention.

This switch 145 includes a solenoid core 146 carrying a pair of contact plates 147 and 148 which are normally moved to their lowered positions by means of a tension spring 149. When the switch 145 is in its illustrated position of FIGURE 8, the other lead lines 150c, 150e or the solenoids 126c, 126e, respectively, are actuated by contacts 151c and 151e, respectively.

Current flow through the contacts 151c and the line 150c to the solenoid 126c is under the control of a cam-actuated valve 153, while flow through the line 150e for the solenoids 126e is under the control of the cam-actuated switch 154. These switches 154 and 153 are actuated upon rotation of a timer motor 165 having a shaft 156 bearing a first cam plate 157 for the switch 154, a second cam plate 158 for the switch 153 and a third cam plate 159 for the switch 130 for the solenoids 126d heretofore described. These cam plates 157, 158 and 159 are multiple lobe cams, each such cam having a number of lobes different from that of the other cams so that the switches 153, 154 and 130 are actuated at different frequencies.

Inasmuch as the group of bubblers C, controlled by the solenoids 126c are located at the cold side of the furnace when the furnace is being fired in the direction of arrows 31, 32, it is desired that these bubblers be operated at a frequency substantially in excess of the frequency of operation of the bubblers of group E, since the bubblers E are located at the hot side of the furnace. Accordingly, the cam 158 is provided with a number of lobes in excess of these of the cam 157. Thus, the solenoids 126c will be actuated by the cam 158 and the switch 153 at a frequency substantially greater than the frequency at which the solenoids 126e are operated by its respective cams 157.

Since the heat content of the molten glass located centrally of the furnace and overlying the bubblers 120d is relatively unaffected by the direction of firing and is subjected to combustion when firing in either direction, this glass portion is agitated uniformly and relatively slightly at a slow bubbling rate. Preferably, though not necessarily, the cam 159 has a number of lobes less than the number of lobes of either of the cams 157, 158.

The structure of the switch 145 is such that upon reversal of firing the valve elements 46 are moved by the cable 47 to close the switch 135 by the cam 140, thereby opening the switch 131 and de-energizing the solenoid 132, so that the spring 149 can move the contact plates 147 and 148 downwardly into contact with contacts 160c and 160e. Thus, the contact 147 of the switch 145 closes the contacts 160e and the solenoids 126e will subsequently be energized at the frequency of the cam 157, while the solenoids 126c will be actuated by the contact plate 148 and the contacts 160c at a frequency determined by the lobes of the cam 158.

Thus, this form of the invention proposes the utilization of electrically actuated, solenoid-type bubbler units energized at differential frequencies at the hot and cold sides of the furnace to vary the agitation effect exerted by the bubbler units C and E. The bubbler units D operate at a constant frequency, namely the frequency of the switch 130 as determined by the cam 159.

THE EMBODIMENT OF FIGURE 9

Figure 9:
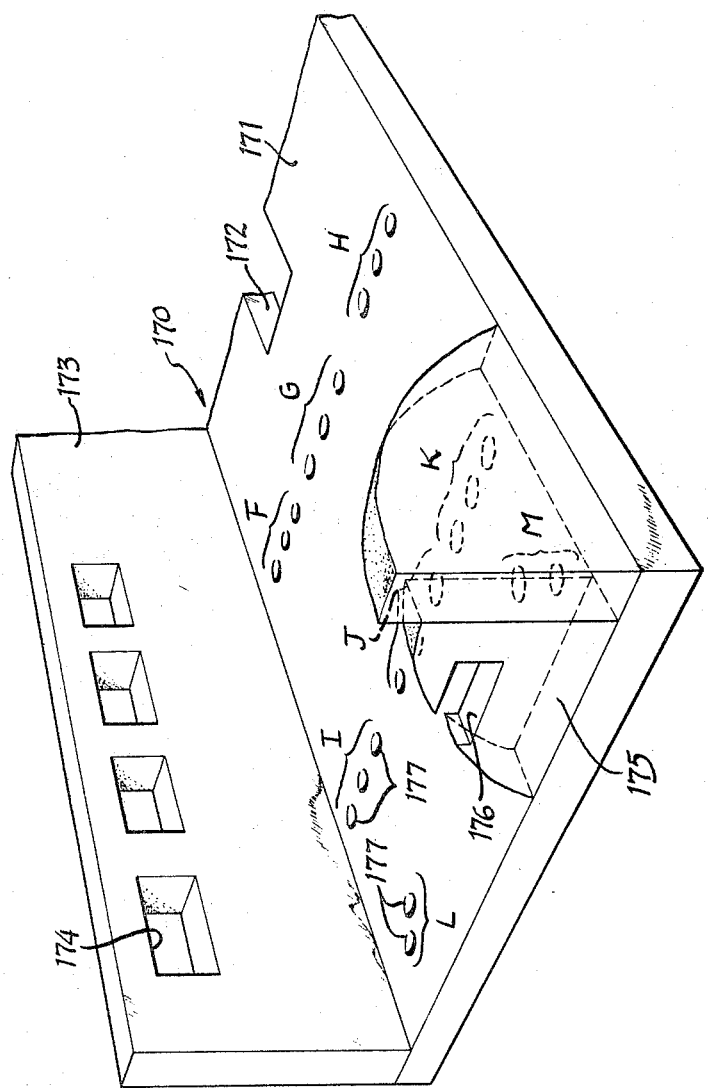
FIGURE 9 is a fragmentary elevational view, with parts broken away, illustrating another embodiment of the present invention.

In that embodiment of the invention illustrated in FIGURE 9 of the drawings, reference numeral 170 refers to a different type furnace having a bottom wall 171 provided with a throat outlet opening 172 and side walls 173 pierced by firing ports 174. An end wall 175 remote from the throat opening 172 has a feed or charging opening 176.

Disposed in the floor 171 are a plurality of bubbler tubes 177. These bubbler tubes 177 are substantially identical with the tubes 60 or 120 heretofore described and are arranged in groups F, G and H extending transversely of the floor 177 in proximity to the throat opening 172; in groups I, J and K extending transversely of the floor between the groups F, G and H and the charging wall 175, and in two smaller groups L and M located at the corners defined by the side walls 73 and the charging wall 175.

THOSE EMBODIMENTS OF THE INVENTION ILLUSTRATED IN FIGURES 10 AND 11

Figure 10:
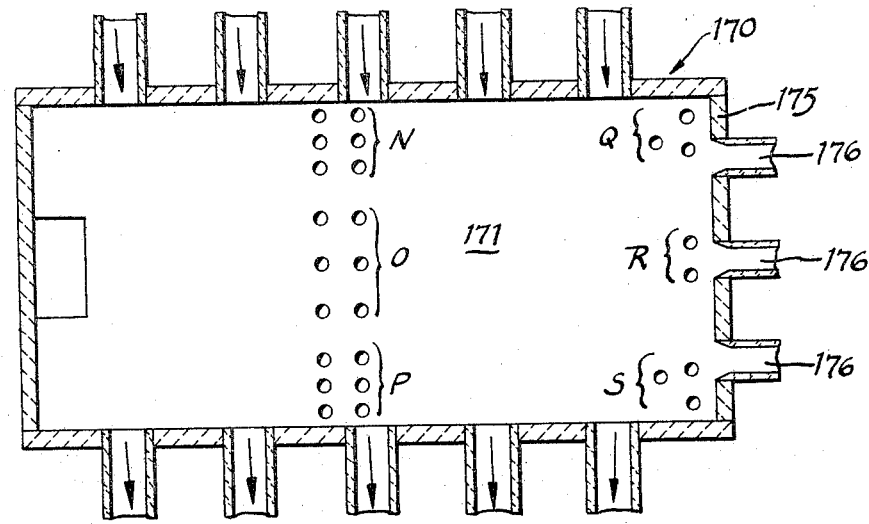
FIGURE 10 is a view similar to FIGURES 1 and 6 and illustrating yet another embodiment of the invention.
Figure 11:
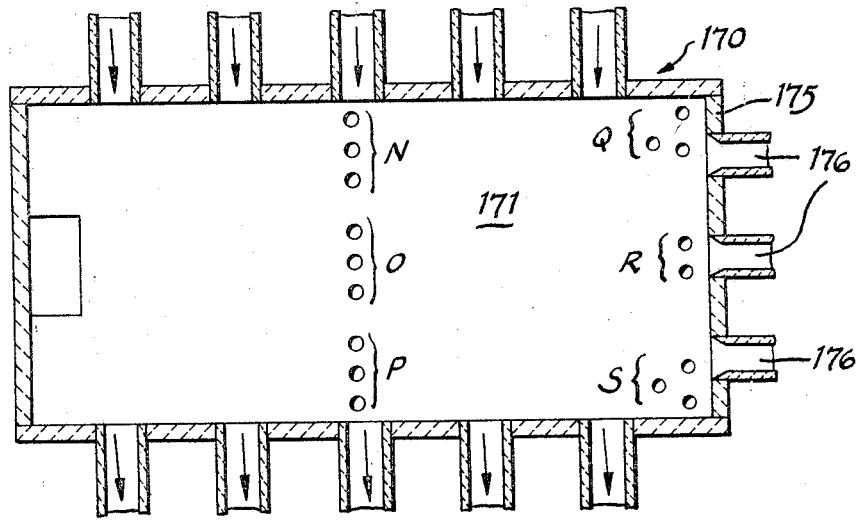
FIGURE 11 is a view similar to FIGURE 10 and illustrating still another embodiment of the invention.

In those embodiments of the invention illustrated in FIGURES 10 and 11, it will be seen that a medial portion of the floor 171 of the furnace 170 is traversed by three groups N, O and P of bubblers, these groups being duplicated in longitudinally closely spaced relation. Additionally, incorporation of the batch into the molten glass is facilitated by groups Q, R and S located in proximity to each of the charging openings 176 in the charging wall 175. The function of these groups Q, R and S will be hereinafter more fully explained.

The embodiment of FIGURE 11 differs from that of FIGURE 10 in that only a single row of bubblers constitute the groups N, O and P, respectively.

THAT EMBODIMENT OF THE INVENTION ILLUSTRATED IN FIGURE 14

Figure 14:
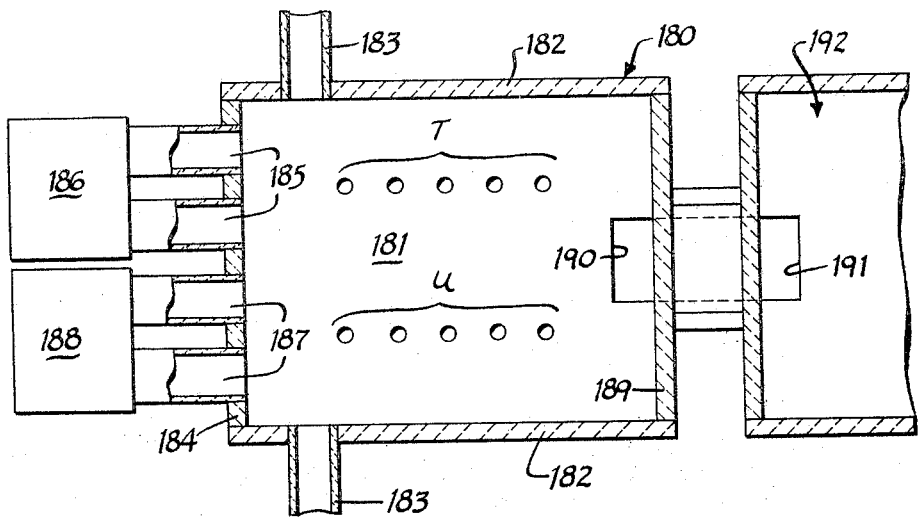
FIGURE 14 is a view similar to FIGURE 1 but illustrating an end-fired furnace.

In FIGURE 14 of the drawings, reference numeral 180 refers to an "end-fired" furnace of a type distinct from those types of furnaces heretofore described. This furnace 180 includes a furnace bottom 181 circumscribed by side walls 182 provided with charging ports 183 through which dry batch ingredients are introduced into the furnace. One end wall 184 of the furnace is pierced by a pair of firing ports 185 jointly connected to a first regenerator 186 and a second pair of ports 187 jointly connected to a second regenerator 188. Opposing the end wall 184 is an end wall 189 having a throat opening 190 through which molten glass flows for entry through a port 191 into a refiner tank indicated generally at 192.

The operation of the unit of FIGURE 14 is such that the furnace is fired concurrently through the matched ports 185 or 187 with the exhaust gases being exhausted through the other matched ports 187 or 185. The furnace floor 181 is pierced by two groups of bubblers, those bubblers of group T being substantially longitudinally aligned with the firing ports 185, while the bubblers of the group U are substantially aligned with the set of ports 187. When firing is being accomplished through the ports 185, the bubblers of the group T are on the cold side while the bubblers of the group U are on the hot side. The bubbling frequency or pressure then varies in accordance with the principles heretofore set forth.

GENERAL OPERATION

From the foregoing detailed description of the various embodiments of the invention, it will be readily appreciated that the various illustrated structures carry out the function of agitating the molten glass body in order to carry out the objectives of the invention as initially set forth above.

More specifically, the concept of agitating to different degrees at different locations within the furnace, these locations being correlated with the temperature of the molten glass body, can be carried out by each of the primary embodiments of the invention illustrated in FIGURES 1 through 5 and 6 through 8, inclusive. In that embodiment of FIGURE 2, this difference in degree of agitation is carried out by the release of high pressure air or other gaseous medium at the "cold" side of the furnace, coupled with the release of gaseous medium under a relatively lower pressure at the "hot" side of the furnace. In that embodiment of the invention illustrated in FIGURE 8 of the drawings, this same function is carried out by the release of bubbles at the same pressures but at differing frequencies. Thus, the high frequency switch 153 operated by the cam 158 operates in conjunction with the primary switch 145 to always release bubbles on the cold side of the furnace at a frequency higher than that at which bubbles are released from the hot side of the furnace by means of the cam 157 and the switch 154.

Of course, the degree of agitation within the molten glass body is dependent primarily upon the volume of gaseous medium which passes therethrough in the form of bubbles. It makes no difference whether this volume is attained by the flow of high pressure gaseous medium or whether this volume is obtained by the flow of a greater frequency of bubbles. In either event, there is a differential bubbling action which is correlated with the temperature at the bubbling location within the molten glass body. Further, this correlation is such that the greater degree of agitation is obtained at the colder portion of the molten glass body, so that the actual temperature differential across the body is reduced.

In addition to obtaining a more uniform temperature throughout the molten glass body, there is a secondary effect of great importance which is obtained by agitation in the manner heretofore described.

Figure 12:
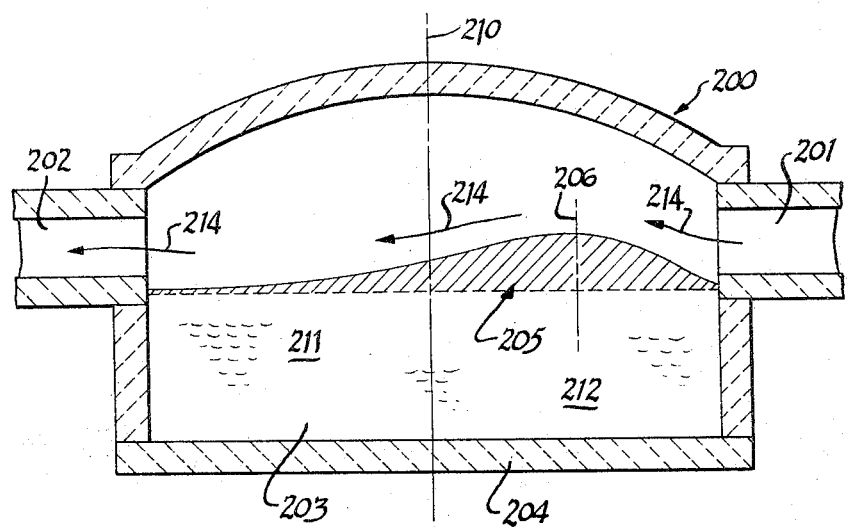
FIGURES 12 and 13 are schematic diagrams illustrating the positioning of the unmelted batch on the surface of the molten glass.
Figure 13:
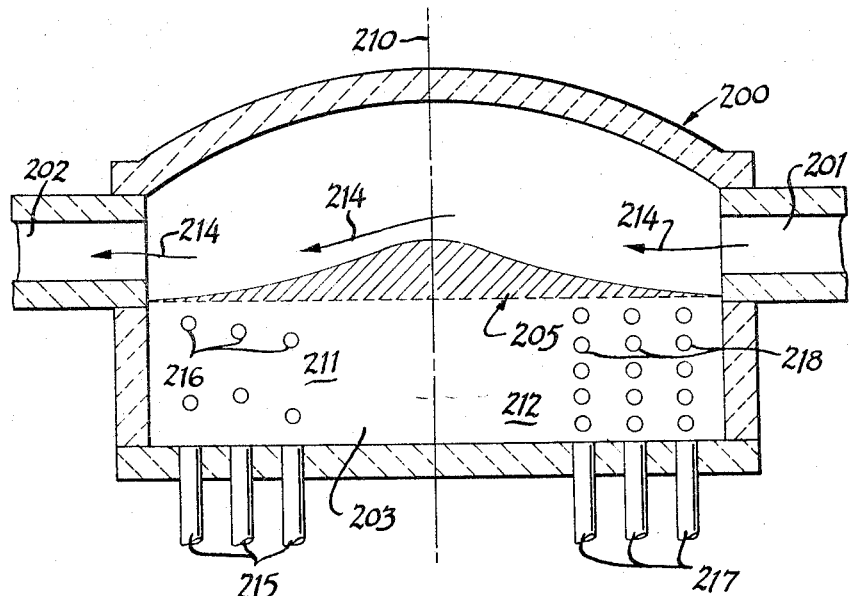

This secondary effect is well illustrated in FIGURES 12 and 13 of the drawings, wherein the furnace 200, representative of any of the furnaces illustrated in the drawings hereof, is being fired through the port 201, the exhaust gases escaping from the port 202. The molten glass body 203 superimposed over the furnace floor 204 is covered with a blanket 205 of unmelted, dry batch ingredients. For ease of reference, the furnace 200 and the molten body 203 can be subdivided by a vertical center plane 210 into a hot side 211 and a relatively cold side 212 when firing occurs from the port 201, as indicated by the directional arrows 214. Of course, the central region of the furnace, i.e. those regions immediately to either side of the vertical center line 210 are also relatively hot inasmuch as these areas are exposed to effective heating in both directions of firing. However, for purposes of illustration, the side 212 may still be considered the cold side and the side 211 the hot side.

As illustrated in FIGURE 12 of the drawings, wherein there is no bubbling effect, the blanket 205 of batch ingredients migrates to the cold side 212. This migration is due to a number of factors, primarily to the fact that the hotter molten glass on the hot side 211 and in the regions surrounding the center line 210 will flow through the furnace and out of the exit throat of the furnace at a higher rate, thus thinning out the blanket of batch which travels with the molten glass therebeneath. Secondly, on the hot side 211 there are thermal currents in the molten glass body far in excess of the thermal currents on the cold side 212. These thermal currents will promote admixture of the blanket 205 with the molten glass therebeneath, and the resultant greater agitation on the hot side 211 will promote greater admixture of the blanket with the molten glass. In addition to these effects, the heated surface layers of the molten glass body 203 will tend to travel toward the cold side 212 and to remain on the surface of the relatively more dense, colder glass on the side 212, thus carrying therewith portions of the batch blanket 205.

All in all, this migration of the batch blanket 205 toward the cold side is a well known phenomenon, and the schematic representation of FIGURE 12 well illustrates what actually occurs under present particle, wherein a vertical plane 206 passing through the area of greatest depth of the batch blanket 205 will lie well to the cold side 212 of the furnace center line 210.

By contrast, the process and apparatus of the present invention centralizes the batch blanket 205 within the furnace as well illustrated in FIGURE 13 of the drawings. From FIGURE 13, it will be seen that the bubblers 215 at the hot side 211 of the molten glass body 203 emit bubbles 216 at a relatively slow rate, while the bubblers 217 at the cold side 212 emit bubbles 218 at a much faster rate. The resultant greater agitation by the emission of the greater volume of gaseous medium through the bubblers 217 will equalize or tend to equalize the temperatures of the molten glass on the hot side 211 and the cold side 212, the non-thermal currents generated within the cold side 212 will result in the flow of hotter portions of the body 203 from the hot side 211 to the cold side 212 and the flow of colder glass from the cold side 212 to the hot side 211, the flow rate of glass through the furnace throat from the cold side 212 will more nearly approach that of the flow of hot glass from the hot side 211. As a result of all of these factors, the batch blanket 205 will be centralized along the vertical median plane 210 as clearly indicated in FIGURE 13 of the drawings. Thus, more of the batch blanket is exposed at the hot side 211 to the combustion product of the fuel being fed to the furnace in accordance with the directional arrows 214, and the resultant substantially uniform terminal agitation of the body 203 will more equally melt the batch blanket 205 for incorporation into the molten body 203.

As a result of the increased uniformity of temperature within all portions of molten glass body, the elimination of channeling of portions only of the molten glass body through the furnace and into the outlet port or throat, and the prevention of batch migration toward the cold side of the furnace, it is possible to obtain increased production output from a furnace provided with the apparatus and operating in accordance with the method of the present invention. Additionally, the efficiency of melting is increased, i.e. the production output is obtained by the consumption of less amounts of fuel than have been heretofore necessary, and the overall efficiency of the regenerative combustion process is materially increased.

To obtain these results, it is broadly necessary that the bubbling be correlated with the direction and frequency of firing as heretofore explained. Several different arrangements of bubblers are illustrated in the disclosure, and it will be appreciated that any one of these arrangements yields the improved results heretofore specified, so long as the correlation between agitation and firing is observed.

The location of additional bubblers in the vicinity of the batch feeding ports, as in the embodiments of FIGURES 9, 10 and 11 is desirable to aid in preventing batch migration and in initiating batch melting as soon as the batch blanket is introduced onto the molten glass body. Further, it will be noted that in addition to bubblers at the hot and cold sides of the furnace, bubblers may be provided in the central regions of the furnace. The operation of these bubblers need not be correlated with the direction of firing, but the presence of these bubblers is desirable in order to provide for the overall agitation of the molten glass body at appropriate locations.

What is claimed is:

1. In a method of melting glass in a reversible gas-fired melter furnace wherein the temperature of molten glass in the furnace varies substantially across the width of the furnace when the furnace is fired from either side, the steps of bubbling a gaseous medium through the molten glass in the furnace at each side of the furnace, increasing the extent of bubbling at that side of the furnace from which firing is being effected and at which the temperature of the molten glass is at a minimum, reducing the extent of bubbling at that side of the furnace toward which firing is being effected, and reversing the extent of bubbling at both said sides when the direction of firing of the furnace is reversed.

2. In a glass melting furnace which is alternately fired from opposing sides thereof, means for increasing the efficiency of melting comprising at least one bubbler adjacent each side wall of the furnace, means for emitting a gaseous medium from each of the bubblers, means for varying the volume of gaseous medium emitted from each of said bubblers and means responsive to the direction of firing of said furnace to emit a substantially greater volume of medium from the bubbler on that side of the furnace from which firing is being accomplished than from the bubbler on the other side of the furnace.

3. In a glass melting furnace of the gas-fired, regenerative type,
   (A) means for firing said furnace comprising
       (1) means for supplying a combustible gas-air mixture to opposite side of said furnace, respectively, and
       (2) means for periodically and selectively reversing the direction of firing, so that said mixture is always directed from one side only across a body of molten glass in said furnace;
   (B) means for bubbling a gaseous medium through said body of molten glass comprising
       (1) at least one bubbler unit adjacent each side wall of said furnace,
       (2) valve means for each side bubbler unit to control the volume of gaseous medium emitted therethrough, and
       (3) valve actuating means for each said valve means; and
   (C) means operatively interconnecting said reversing means and said valve actuating means to emit a greater volume of gaseous medium from said bubbler unit on that side from which the furnace is being fired than from said bubbler unit on the other side thereof.

4. In a regeneratively fired glass melting furnace in which firing is alternated from one side to another to create an appreciable heat differential across the width of the furnace, the improvements of means for emitting a gaseous medium at the furnace floor for passage upwardly through the molten glass in the furnace at each side thereof, means for varying the emission of said medium so that a greater quantity of gaseous medium is emitted at one side of said furnace from which firing is being effected and at which the temperature of the molten glass is at a minimum that from the other side of said furnace, and means responsive to reversal of the direction of firing for reducing the quantity of medium so emitted at the one side of the furnace and for increasing the quantity of gaseous medium emitted from said other side of the furnace when the firing of the furnace is reversed.

References Cited by the Examiner

UNITED STATES PATENTS

| | | | |
|---|---|---|---|
| 1,944,855 | 1/1934 | Wadman | 13—6 |
| 2,331,052 | 10/1943 | Shadduck | 65—178 |
| 2,767,235 | 10/1956 | Herrold et al. | 13—6 |
| 2,890,548 | 6/1959 | Wright | 65—178 |
| 2,909,005 | 10/1959 | Beck et al. | 65—178 |

DONALL H. SYLVESTER, *Primary Examiner.*

D. CRUPAIN, *Assistant Examiner.*